United States Patent

Garnault et al.

[11] Patent Number: 6,053,067
[45] Date of Patent: Apr. 25, 2000

[54] STEERING LOCK FOR A MOTOR VEHICLE STEERING COLUMN

[75] Inventors: Joël Garnault, Sannois; Jean-Claude Boulay, Creteil, both of France

[73] Assignee: Valeo Securite Habitacle, Creteil, France

[21] Appl. No.: 08/985,095

[22] Filed: Dec. 4, 1997

[30] Foreign Application Priority Data

Dec. 5, 1996 [FR] France .................................. 96 15066
Jul. 29, 1997 [FR] France .................................. 97 09840

[51] Int. Cl.[7] .................................................. B60R 25/02
[52] U.S. Cl. ................................ 74/492; 70/184; 70/188; 70/218; 74/531; 192/70.23; 192/223
[58] Field of Search ........................... 74/492, 462, 531; 70/182–187, 218, 188; 192/70.23, 223

[56] References Cited

U.S. PATENT DOCUMENTS

| 1,360,616 | 11/1920 | Borck . | |
|---|---|---|---|
| 1,512,072 | 10/1924 | Williamson . | |
| 3,709,055 | 1/1973 | Groove | 74/462 |
| 5,152,363 | 10/1992 | Mertens et al. | 70/218 |
| 5,172,576 | 12/1992 | Milton | 70/185 |
| 5,685,180 | 11/1997 | Qualters et al. | 74/530 |

FOREIGN PATENT DOCUMENTS

| 0 623 495 | 4/1994 | European Pat. Off. . |
|---|---|---|
| 337 444 | 10/1930 | United Kingdom . |
| 339940 | 12/1930 | United Kingdom . |

OTHER PUBLICATIONS

Patent Abstracts of Japan, vol. 096, No. 012, Dec. 26, 1996 & JP 08 198057 A (Koyo Seiko Co Ltd), Aug. 6, 1996.

Primary Examiner—David A. Bucci
Assistant Examiner—William C Joyce
Attorney, Agent, or Firm—Morgan & Finnegan, LLP

[57] ABSTRACT

An antitheft device is provided for locking a motor vehicle steering column against rotation. The steering column includes a gear wheel which is fixed coaxially to the steering column shaft, and a pinion with an axis parallel to the steering column axis. The pinion is mounted for rotation in a moveable pinion support which is displaceable between a disengaged position, in which the pinion is disengaged from the gear wheel, and an engaged position in which the pinion is in mesh with the gear wheel. The steering lock also includes a clutch for preventing rotation of the pinion about its axis on the pinion support below a specific torque.

5 Claims, 7 Drawing Sheets

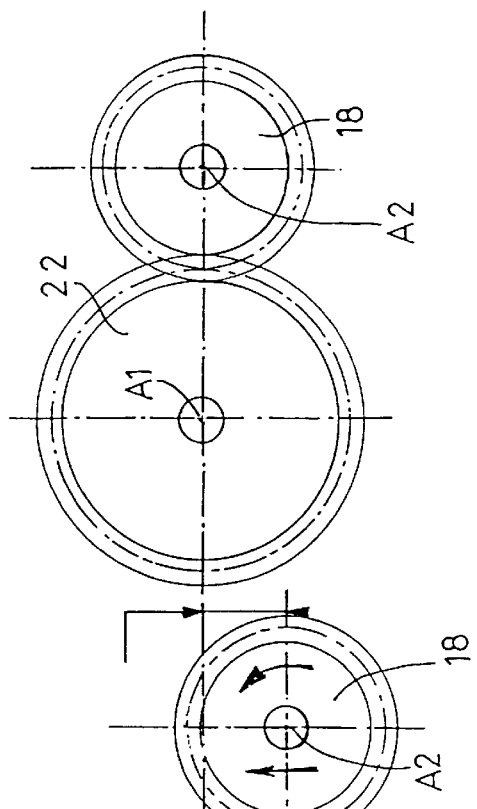
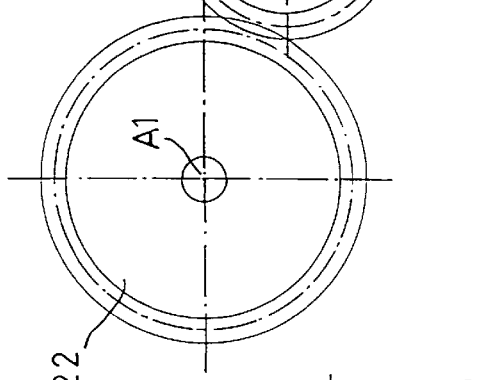
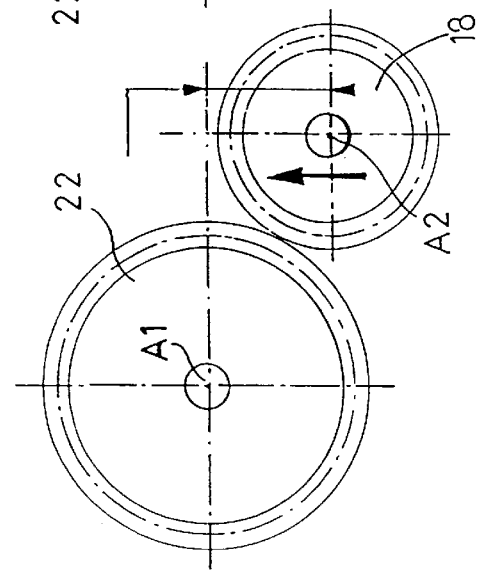

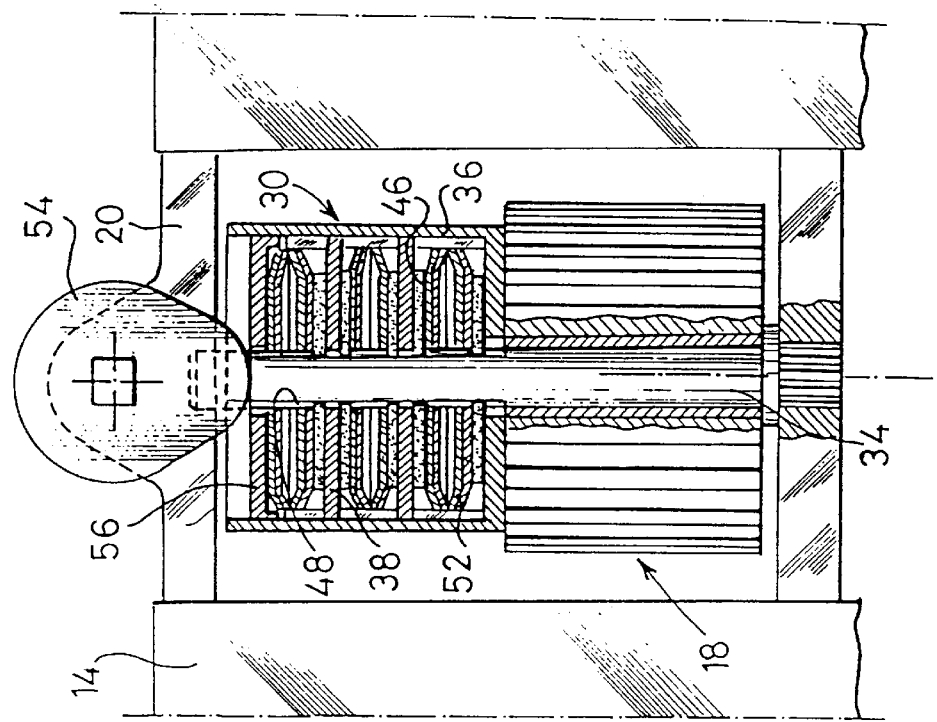
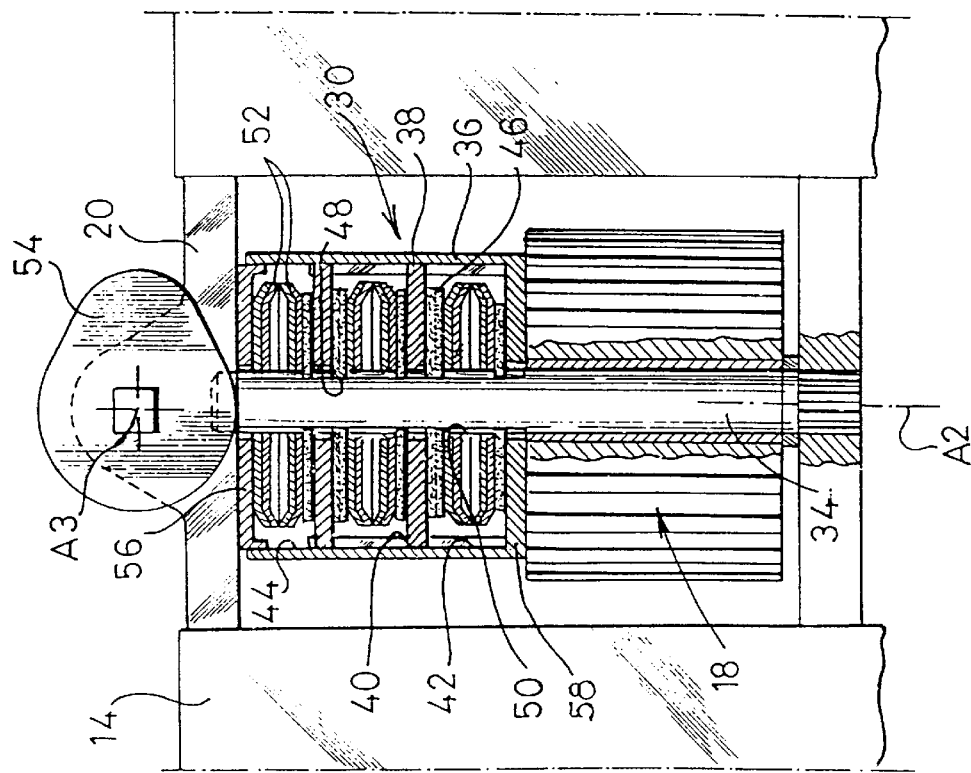

STEERING LOCK FOR A MOTOR VEHICLE STEERING COLUMN

FIELD OF THE INVENTION

This invention relates to antitheft devices in the form of a steering lock for a motor vehicle steering column.

BACKGROUND OF THE INVENTION

Known types of steering locks usually make use of a retractable lock bolt for the purpose of preventing any rotation of the shaft of the steering column. This bolt is carried by a structural element of the vehicle, and when the steering lock is engaged, the bolt is deployed into a recess formed in the shaft of the steering column, so as to prevent the latter being turned about its axis.

Such a device, in spite of the fact that it is so widely used, has a certain number of disadvantages. First, when the driver of the vehicle activates the locking system, locking does not take place automatically. In this connection, the steering lock is not properly effective, unless the bolt is engaged in the recess, and which is only possible if the recess, and therefore the steering column, occupies a particular rotational position in which it is aligned with the bolt. While it has been proposed to provide the steering column with a set of several recesses, spaced apart angularly at regular intervals around the steering column shaft; on most occasions, the driver still has to maneuver the steering wheel before the steering lock can be properly engaged, so as to put a recess in the steering column into register with the bolt and thereby lock the antitheft device effectively.

This effective operation is generally detectable by a click which occurs as the bolt of the steering lock comes into its locked position. The steering column and the steering wheel then have no more than a very limited angular displacement.

In addition, such a conventional design of a steering column lock obliges the driver to act on the steering wheel at the instant of unlocking, so as to enable the bolt to be disengaged from the recess in the steering column shaft. In this connection, the friction forces of the bolt against the side walls of the recess can prevent withdrawal of the bolt, and it is necessary to effect an angular displacement of the bolt in the recess in order to be able to release the bolt, by eliminating the contact with the walls of the recess.

In addition, in current practice, during an attempt by a thief to break the steering lock, a very high torque is applied to the steering column through the steering wheel, in order to break the bolt or one of its actuating elements.

If the bolt and its actuating mechanism resist such efforts, the thief will try and apply even more force to the steering column, which can lead to damage to other parts of the steering system, such as the steering wheel or even the support of the steering column shaft.

On the other hand, if the bolt and its mechanism do yield, it can become possible to drive the vehicle. However, rupture of one of the components of the mechanism can give rise to serious problems as to operational reliability. The steering column may then become jammed while the vehicle is in motion.

DISCUSSION OF THE INVENTION

In order to solve these various problems, the invention proposes a new concept for a steering lock or antitheft device for a steering column.

According to the invention, an antitheft device for a motor vehicle steering column is characterised in that the steering column comprises a gear wheel which is fixed to the steering column in rotation about their common axis, in that the antitheft device comprises a pinion having an axis parallel to the axis of the steering column and of the gear wheel, the pinion being mounted for rotation on a moveable pinion support displaceable between a disengaged position, in which the pinion is disengaged and a position in which the pinion is engaged and in which the latter is in mesh with the gear wheel of the steering column, and in that immobilising means are provided for immobilising the pinion against rotation about its axis with respect to the pinion support, whereby to prevent rotation of the shaft of the steering column about its axis when the pinion is in its meshed position.

According to a preferred feature of the invention, the device including means for activating the device, the said activating means being adapted to displace the pinion from its disengaged position to its meshed position, and then to immobilize the pinion against rotation.

Preferably the trajectory of the pinion between its disengaged and meshed positions is substantially parallel to a common tangent of the pinion and the gear wheel of the steering column, such that the pinion reaches its meshed position by pivoting about its axis due to teeth of the pinion and gear wheel coming into contact with each other.

The support for the pinion is preferably arranged to slide in a rectilinear direction parallel to the tangent common to the gear wheel and pinion.

The pinion support is preferably arranged to pivot about an axis parallel to the axis of the steering column and parallel to the axis of the pinion.

According to another preferred feature of the invention, each tooth of the pinion and the gear wheel has a rounded tooth crest so as to cause scrapping of the teeth one against the other when two teeth of the pinion and gear wheel come into abutment against each other as the pinion is coming into mesh.

The means for immobilizing the pinion against rotation preferably includes means for limiting the torque by which the rotational movement of the pinion is blocked against such rotation.

According to a further preferred feature of the invention, the means for immobilizing the pinion include a friction device, at least one element of which is coupled in rotation to the pinion, the other element thereof being coupled in rotation with the support of the pinion.

Preferably then, the pinion is mounted for rotation on a spindle which is fixed to the pinion support, and the immobilizing means comprises a friction clutch including at least one fixed disc which is coupled in rotation to the spindle and to the pinion support, together with at least one moveable disc which is coupled in rotation to a cylindrical cage, the said cage being fixed with respect to the pinion for rotation with the latter, the discs being disposed within the cage, with at least some of the discs being moveable axially so that they can be pressed axially against each other.

This friction clutch preferably comprises a plurality of fixed discs coupled to the spindle, with each fixed disc being disposed axially between two moveable discs coupled to the pinion.

An element which is deformable elastically in the axial direction is preferably interposed between two consecutive moveable discs.

The means for immobilizing the pinion against rotation are preferably controlled by a cam device.

Further features and advantages of the invention will appear on a reading of the following detailed description of some preferred embodiments of the invention, which is given by way of non-limiting example only and with reference to the accompanying drawings.

BRIEF DESCRIPTION OF THE DRAWING

FIGS. 3, 4 and 5 are diagrams illustrating the principle of operation of a steering lock in accordance with the invention.

FIG. 6 shows the pinion in a disengaged position; FIG. 7 shows the pinion in an engaged or meshed position; FIG. 8 shows a situation in which the pinion lies with one of its teeth in radial alignment, or face to face relationship, with a tooth of the gear wheel; and finally, FIG. 9 shows an intermediate position of engagement following scraping of one tooth against another, just before the pinion reaches its meshed position.

FIG. 10 shows in axial cross-section one embodiment of a stop means for immobilising the pinion against rotation, shown here in a condition for free rotation of the pinion.

FIG. 11 is the same as FIG. 10 except that the stop means is here shown in a condition in which the pinion is locked against rotation.

DESCRIPTION OF PREFERRED EMBODIMENTS OF THE INVENTION

Figure 1:
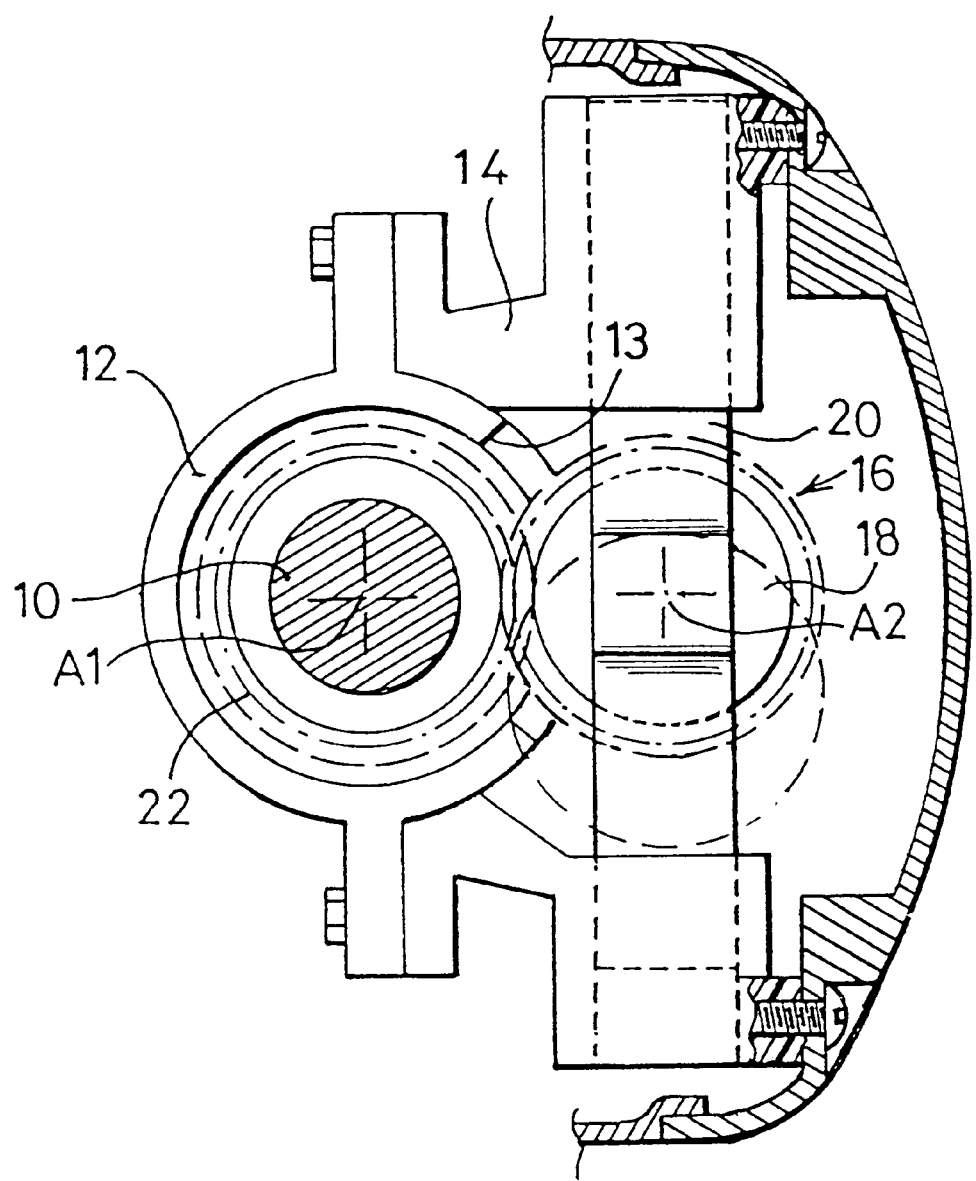
FIG. 1 is a diagrammatic view in transverse cross-section of a steering lock in accordance with the invention, associated with a steering column of a motor vehicle.

Reference is first made to FIG. 1, which shows a steering column 10 for a motor vehicle. The steering column comprises a steering shaft, which is mounted for rotation about its axis A1 in a guide tube 12 which is fixed to a steering column support 14. A steering lock, or antitheft mechanism, 16 is provided in association with the steering column 10. The steering lock 16 comprises a pinion 18 having an axis A2 parallel to the axis A1 of the steering column 10, this pinion being mounted for rotation on a sliding pinion support 20, or slider, for cooperation with a gear wheel 22, here in the form of a spur gear ring 22, which is carried by the steering column shaft 10.

As can be seen in FIGS. 1 to 5, to all of which reference is now made, the slider 20 causes the pinion 18 to be displaced in the direction parallel to the tangent which is common to the pinion 18 and the gear wheel 22 when these latter are in mesh with each other. The pinion 18 is thus able to be displaced between a disengaged position, in which it is out of cooperation with the gear wheel 22, and an engaged position in which it is fully in mesh with the gear wheel 22. The disengaged position corresponds to an unlocked state of the steering lock, while the engaged position corresponds to a locked state of the steering lock when the pinion 18 is prevented from rotating about its axis A2.

Figure 6:
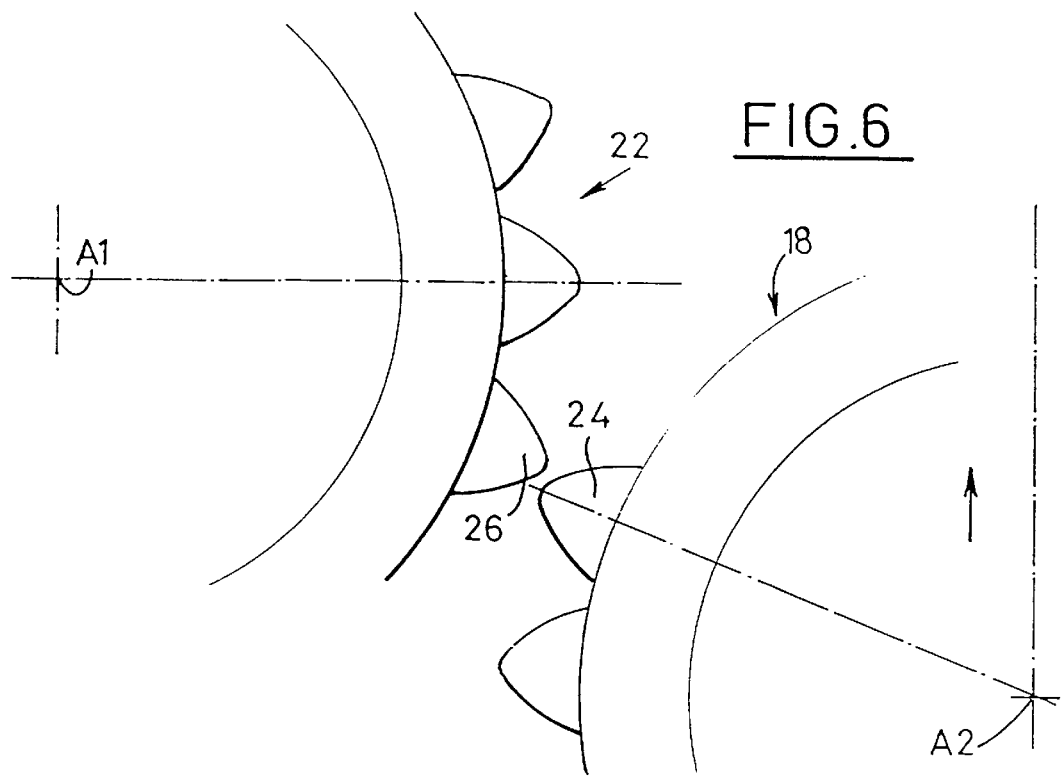
FIGS. 6 to 9 are diagrammatic views showing in more precise detail the relative positions of the pinion and the gear wheel in a steering lock according to the invention. More particularly.

Reference is now made in particular to FIGS. 3 to 9, in order to describe the various steps in the operation of the steering lock. When the steering lock is in its unlocked state as shown in FIGS. 3 and 6, the pinion 18 and the spur gear ring 22 are free to rotate with respect to each other, so that the driver has full control of the steering, i.e. can use the steering column 10 to direct the steered wheels of the vehicle.

When the steering lock 10 is actuated with a view to putting it in its locked state, the pinion 18 is displaced in the direction tangential to the spur gear ring, defined above, in such a way that the teeth 24 of the pinion 18 and the teeth 26 of the spur gear ring 22 cooperate with each other by meshing together. During the whole of the displacement of the pinion 18 between its unlocked position shown in FIG. 3 and its locked position shown in FIG. 5, the pinion 18 is free to rotate about its axis with respect to the pinion support 20.

The pinion support 20 can be actuated by any suitable actuating means (not shown). In one example such actuating means are of the rack type; in another they comprise a worm and worm wheel mechanism in which the worm wheel is immobilised against rotation about its axis so as to be displaceable in straight line movement by rotation of the worm.

Figure 8:
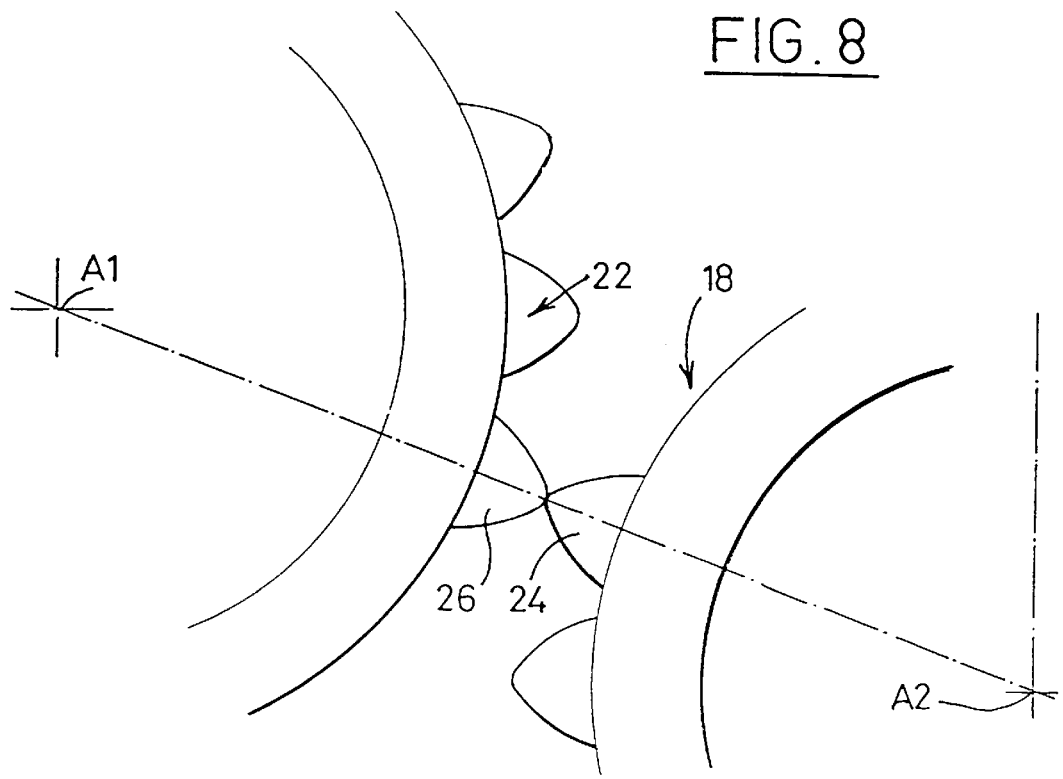

FIG. 8 shows an unfavorable situation, in which the pinion 18 and the spur gear ring 22 lie in relative angular positions such that a tooth 24 of the pinion 18 and a tooth 26 of the spur gear ring 22 are in direct radial alignment with each other, with their crests touching when the pinion 18 comes into contact with the spur gear ring 22. This may be referred to as a face to face situation. In this case, the radii of the pinion 18 and spur gear ring 22 passing through the tips (crests) of the two touching teeth are aligned with each other so that, in theory, jamming could occur such as to prevent any continued tangential movement of the slider 20 and pinion 18.

Figure 9:
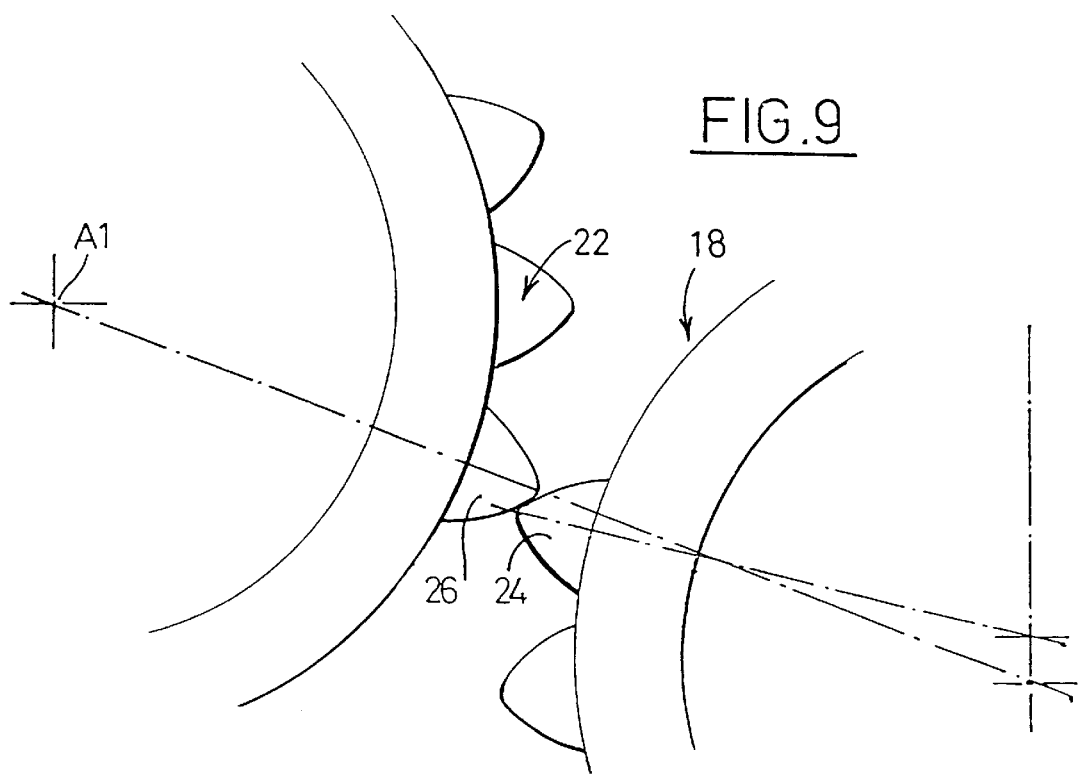

In order to avoid this possibility, the teeth 24 and 26 are configured with a positive slip-off, such that each tooth has a low head thickness in the tangential direction and, in addition, a rounded crest. Thus, when the contact pressure between the two teeth increases due to the displacement of the pinion 18 in the tangential direction, the tooth 24 of the pinion 18 tends to scrape on the associated tooth 26 of the spur gear ring 22 by simple rotation of the pinion 18 about its axis A2, as is shown in FIG. 9. In this way, any jamming situation is avoided and the slider 20 is able to continue to drive the pinion 20 into its meshing position, with the cooperation between the teeth of the pinion 18 and those of the spur gear ring 22 then causing the pinion 18 to rotate (in the anti-clockwise direction in the configuration shown in the drawings).

Figure 7:
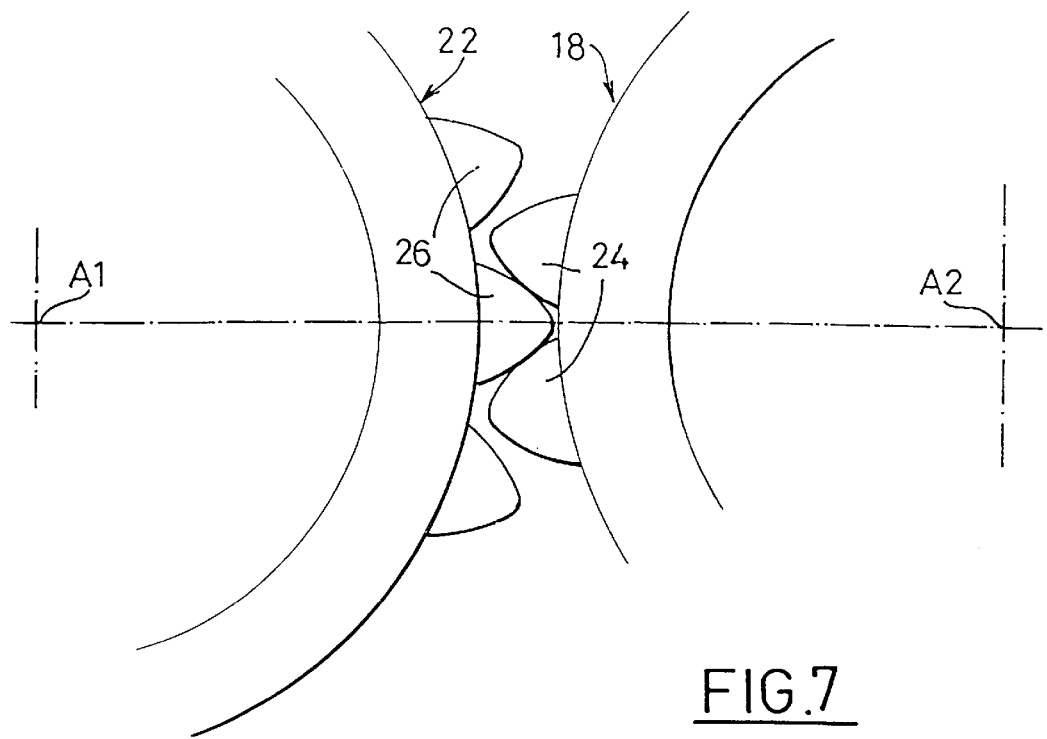

When the pinion is in its meshing position which is shown in FIGS. 5 and 7, and in which the distance between the axes A1 and A2 of the spur gear ring 22 and the pinion 18 is a minimum, stop means, or immobilizing means, are brought into action so as to oppose any further rotation of the pinion 18 about its axis A2. As a result, both the wheel 22 and the shaft of the steering column 10 are also immobilized against rotation, so that the steering lock is now in the locked condition. Another feature is that the stop means are able to operate regardless of the angular position of the pinion 18. The stop means limit the torque applied on the steering column to prevent rotation of the latter.

FIGS. 10 and 11 show a preferred embodiment of these stop means for preventing the pinion 18 from rotating. These stop means consist essentially of a multi-disc clutch 30 which is arranged coaxially with the pinion 18, and which is controlled by a cam 54. In the embodiment shown by way of example in FIGS. 10 and 11, the pinion 18 is mounted for free rotation on a guide spindle 34 on the axis A2, while the spindle 34 is fixed to the pinion support 20 against relative rotation with respect to the latter.

Figure 2:
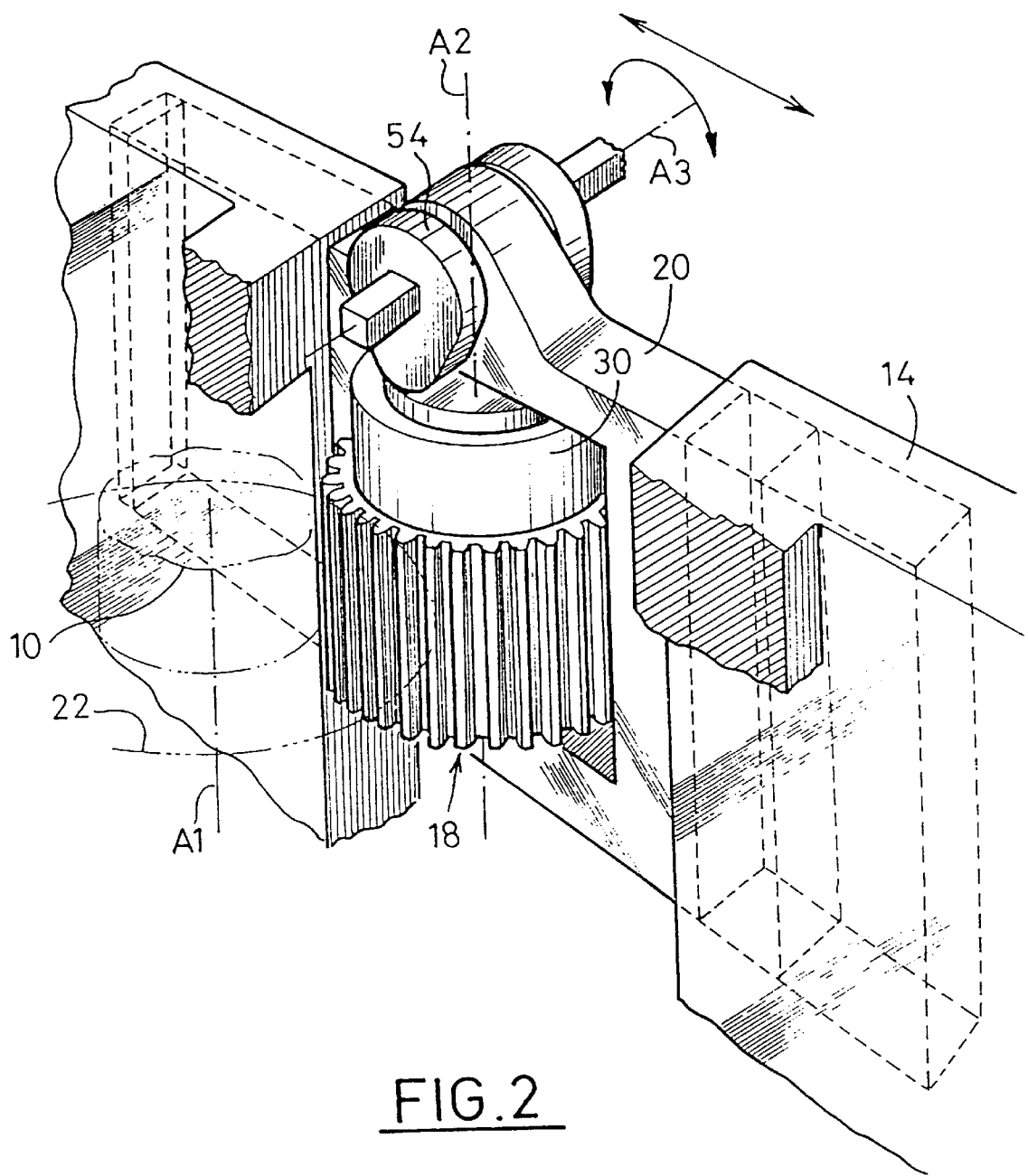
FIG. 2 is a diagrammatic perspective view showing one embodiment, by way of example, of the pinion support in the steering lock of FIG. 1.

As can be seen most particularly in FIG. 2, the pinion support 20 is, in this embodiment, in the form of a frame which is mounted for sliding movement in the steering column support 14, tangentially with respect to the shaft 10. The frame 20 is formed with a window in which the pinion 18 is rotatably mounted. The steering column guide tube 12 has an aperture 13 (see FIG. 1) which leaves at least part of the circumference of the gear wheel or spur gear ring 22 exposed, so that the latter can cooperate with the pinion 18.

In FIGS. 10 and 11, the multi-disc clutch 30 is contained within a tubular cylindrical cage 36, which is fixed to the pinion 18 for rotation with the latter, and which here extends axially above the pinion. It is however possible to arrange the cage 36 at least partly within the pinion 18.

The clutch 30 includes a set of discs 38 which are moveable with the pinion 18. These moveable discs 38 are arranged inside the cage 36, and are prevented from rotating with respect to the latter while being moveable axially along the axis A2 of the clutch. For this purpose the moveable discs 38 are provided with lug elements 40 on their outer periphery. These lugs 40 are received in axial grooves 42 which are formed in the internal cylindrical surface 44 of the cage 36.

The multi-disc clutch 30 also includes a set of fixed discs 46 which are secured to the fixed guide spindle 34 so that they are fixed against rotation with respect to the latter, while at the same time being free to move axially with respect to the spindle 34. For this purpose, the fixed discs 46 include a set of fingers 48 which extend radially inwardly from their inner periphery, and which are received in corresponding axial grooves 50 formed in the guide spindle 34.

As can be seen in the drawings, each moveable disc 38 is sandwiched axially between two fixed discs 46, so as to constitute stacks of three discs. Between each of these stacks of three discs and the next, there are interposed means which are deformable elastically in the axial direction. In this example these deformable means consist of superimposed Belleville washers. The stack of Belleville washers and discs, arranged in this way, is able to be compressed axially so that the axial compression force exerted on the discs couples the moveable discs 38 to the fixed discs 46 by friction, the result of which is that the pinion 18 is immobilized with respect to the pinion support 20.

In the embodiment shown here, the axial compression of the stack is effected by means of a cam 54, which here consists of an eccentric cam mounted in rotation about an axis A3 at right angles to, and intersecting, the axis A2 of the multi-disc clutch 30. This control cam 54 is mounted above the clutch. The cam 54 is controlled in rotation over a course of travel of about a quarter of one turn, for example by a suitable electric motor (not shown). The cam 54 acts on a flat annual thrust plate 56, which is guided in sliding movement in the cylindrical cage 36, and which compresses the discs 38 and 46 and the Belleville rings 52 axially against a transverse base wall 58 of the cage 36.

In a preferred arrangement, this immobilizing device, with its multi-disc clutch, enables a maximum coupling torque to be determined between the fixed discs 38 and the moveable discs 46. Above this maximum torque, rotation of the pinion 18 with respect to the pinion support 20 is possible without there being any need to rupture any element at all, but once the torque on the pinion 18 ceases to be applied, or becomes lower than the limiting value, the pinion 18 is once against rotation.

This arrangement is of particular advantage in the context of a motor vehicle antitheft system. In this connection, the immobilizing device prevents the locking device being destroyed during an attempt to break it by application of a torque on the steering column. It is therefore possible to arrange for slipping of the clutch 30 to occur when a torque is applied on the steering column which is greater than 100 or 200 Newton-meter, this torque being one which makes it impossible to drive the vehicle, even if it does not prevent a slight amount of steering movement.

This immobilizing device for the pinion 18, and therefore for the steering column 10, has the advantage of being able to come into operation regardless of the angular position of the pinion 18, and therefore that of the steering column. In addition, the progressive release of the immobilizing force enables progressive release of the steering column to be obtained. Thus, there is no risk of seeing the steering wheel turning sharply during unlocking of the antitheft device. This is in contrast with what can happen with antitheft devices of conventional design, for example when the road wheels of the vehicle are subjected to a steering force after hitting a kerb.

The apparatus of the invention is also particularly silent in operation, and does not call for any action by the driver of the vehicle either to lock or to unlock it. It is very easy to incorporate this device in an electrically controlled antitheft system, in which the means for actuating the slider 20 and the cam 54 can be controlled in sequence, for example by an electronic central antitheft system control unit.

Figure 12:
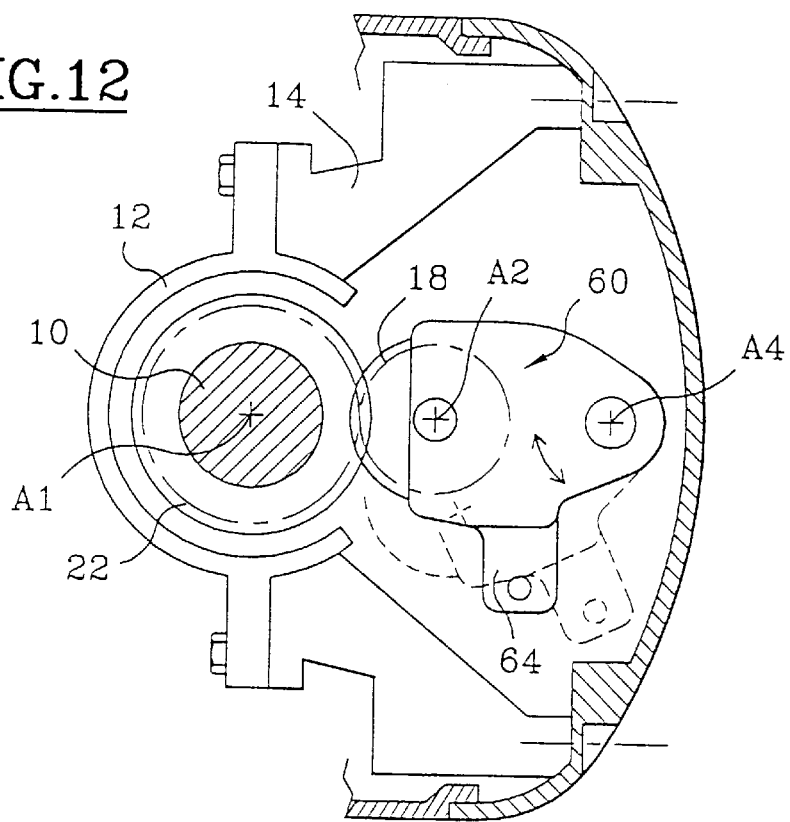
FIG. 12 is a view similar to FIG. 1, showing a second embodiment of the invention in which the pinion support is pivotable about an axis parallel to the axis of the steering column, between a disengaged position of the pinion and a meshed position of the pinion.
Figure 13:
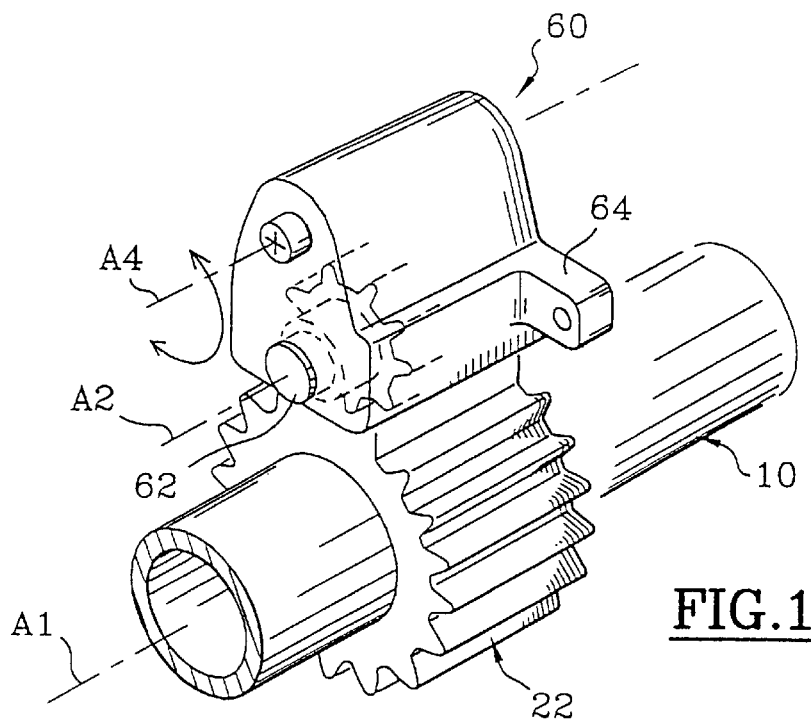
FIG. 13 is a diagrammatic perspective view showing part of the arrangement in the second embodiment of the invention seen in FIG. 12.

In the embodiment described above, the trajectory of the piston 18 is substantially parallel to a tangent to the spur gear 22, but this trajectory may be curved instead of straight. Thus, and with reference to FIGS. 12 and 13, in a second embodiment of the invention the pinion support, indicated at 60, is mounted for pivoting movement about an axis A4 parallel to the axis A1 of the steering column 10 and parallel to the axis A2 of the pinion 18, between its two positions. In FIG. 12 the pinion 18 is shown in its disengaged position in broken lines, and in its meshing position in full lines, with respect to the gear wheel or spur gear ring 22 of the steering column 10.

In order to ensure that the trajectory of the piston 18 is tangential to the spur gear ring 22, the axis A1 of the steering column 10, the axis A2 of the pinion 18 and the axis A4 of rotation of the pinion support 20 are located in a common plane when the pinion support 20 is in the position in which the pinion 18 is meshed, as is shown in solid lines in FIG. 12.

The pinion support 60 in this example is made in the form of a casing which defines an internal housing (not shown) in which the pinion 18 is mounted for rotation about its axis A2. This housing in the support 60 is open in a window which is formed in a side face of the support 60, which enables part of the set of teeth of the pinion 18 to extend radially out of the housing so that they can engage with the spur gear ring 22.

Preferably, the immobilizing means 30 for preventing rotation of the pinion 18 are themselves also arranged within the housing in the pinion support 60, and include control buttons 62 which extend out of the support 60 along the axis A2 of rotation of the pinion 18. An actuator (not shown) is arranged to act on the buttons 62 in the axial direction when the pinion support 60 is in the position in which the pinion 18 is in mesh with the gear wheel 22. The immobilizing means 30 for the pinion 18 may for example consist of a torque-limiting clutch generally the same as that as described above with reference to the first embodiment of the invention.

Actuating means (not shown) for the pinion support 60 are arranged to act on a radially oriented ear 64 of the support 60, so as to drive the latter in rotation about the axis A4.

What is claimed is:

1. A steering lock for a motor vehicle having a steering column defining a first axis and a gear wheel mounted coaxially on the steering column for rotation with the steering column, the steering lock comprising:

a pinion defining a second axis parallel to the first axis;

a pinion support carrying the pinion configured to allow rotation of the pinion on the pinion support and adapted to be displaced between an unlocked position and a locked position, the pinion being disengaged from the gear wheel in said unlocked position and engaged with the gear wheel in said locked position; and stop means operatively interposed between the pinion support and the pinion adapted to immobilize the pinion against rotation about the second axis with respect to the pinion support, and to prevent rotation of the steering column about said first axis when the pinion is in the locked position;

actuating means for actuating the stop means, whereby to immobilize the pinion against rotation after the pinion support has been displaced from said unlocked position to said locked position;

wherein said displacement of the pinion support between said unlocked position and locked position defining a path substantially parallel to a common tangent which is common to the pinion and the gear wheel when the pinion and gear wheel mesh;

wherein an at least one tooth of the pinion meshes with an at least one tooth of the gear wheel at the locked position by pivoting about the second axis.

2. A steering lock for a motor vehicle having a steering column defining a first axis and a gear wheel mounted coaxially on the steering column for rotation with the steering column, the steering lock comprising:

a pinion defining a second axis parallel to the first axis;

a pinion support carving the pinion configured to allow rotation of the pinion on the pinion support and adapted to be displaced between an unlocked position and a locked position, the pinion being disengaged from the gear wheel in said unlocked position and engaged with the gear wheel in said locked position, said displacement of the pinion support between said unlocked position and locked position defining a path substantially parallel to a common tangent which is common to the pinion and the gear wheel when the pinion and gear wheel mesh;

a guide spindle fixed to the pinion support, upon which the pinion is rotatably mounted; and a friction clutch having at least one fixed disc coupled in rotation to the spindle and the pinion support, at least one moveable disc for cooperation with the at least one rotationally fixed disc, and a cylindrical cage coupled in rotation with the pinion, the fixed and moveable discs being mounted within the cage, the at least one moveable disc being coupled to the cage for rotation therewith, at least some of the fixed discs or moveable discs being axially moveable so that the fixed and moveable discs can be urged axially into engagement one with another.

3. A steering lock according to claim 2, wherein the at least one fixed disc is a plurality of fixed discs coupled to the guide spindle and the at least one moveable disc is a plurality of said moveable discs coupled to the pinion, and wherein each moveable disc is interposed axially between two fixed discs.

4. A steering lock according to claim 3, further comprising a resiliently axially deformable element interposed between two consecutive moveable discs.

5. A steering lock according to claim 2, further comprising a cam configured to urge the fixed and moveable discs together.

* * * * *